United States Patent [19]
Rollason

[11] Patent Number: 5,248,046
[45] Date of Patent: Sep. 28, 1993

[54] CRAYFISH GRADING APPARATUS

[75] Inventor: Samuel Rollason, Baton Rouge, La.

[73] Assignee: The Board of Supervisors of Louisiana State University, Baton Rouge, La.

[21] Appl. No.: 780,109

[22] Filed: Oct. 21, 1991

[51] Int. Cl.⁵ .............................................. B07B 13/05
[52] U.S. Cl. .................................... 209/675; 209/394; 209/417; 209/676; 119/213
[58] Field of Search ................ 209/17, 137, 353, 355, 209/393, 394, 395, 417, 675, 676; 119/2, 3

[56] References Cited

U.S. PATENT DOCUMENTS

| | | | |
|---|---|---|---|
| 1,172,634 | 2/1916 | Savage | 209/17 |
| 1,350,080 | 8/1920 | Notter | 209/417 X |
| 1,491,802 | 4/1924 | Irwin | 209/394 X |
| 2,125,469 | 8/1938 | Ulrich | 209/17 |
| 3,204,605 | 9/1965 | Vroman | 209/394 X |
| 3,556,296 | 1/1971 | Buscemi, Jr. | 209/675 |
| 3,833,119 | 9/1974 | Brown | 209/675 |
| 3,889,639 | 6/1975 | Day et al. | 119/2 |
| 4,763,794 | 8/1988 | Billington et al. | 209/676 X |
| 4,915,824 | 4/1990 | Surtees | 209/137 X |

Primary Examiner—Joseph E. Valenza
Assistant Examiner—Tuan N. Nguyen
Attorney, Agent, or Firm—William David Kiesel; Robert C. Tucker

[57] ABSTRACT

An apparatus for grading crayfish is provided, comprising a tank having a bottom and sides forming a cavity which will hold water; and a grate assembly having multiple, vertically separated tiers to form spaces between adjacent tiers of sufficient size to accommodate a pre-determined amount of crayfish of pre-determined size. Each tier comprises multiple, horizontally separated round bars, the spacing between the bars in each succeeding lower tier being less than the spacing in the upper tiers. A process for grading crayfish of multiple sizes is also provided, comprising the steps of loading crayfish onto a top tier of a grate assembly of the type described above positioned in a water-filled tank, lifting the grate assembly from the tank after a period sufficient in time to allow all crayfish to seek the lowest level tier achievable in accordance with their size, and removing all crayfish located between one set of adjacent tiers separately from crayfish located between any other set of adjacent tiers.

2 Claims, 3 Drawing Sheets

CRAYFISH GRADING APPARATUS

BACKGROUND OF THE INVENTION

1. Field of the Invention

This invention relates generally to devices for grading live crawfish according to their size.

2. Prior Art

As with the marketing of any commodity, farmers, producers and distributors are required to comply with certain industry standards relating to quality regarding size, shape, weight, freshness or other such characteristics of the goods. Adherence to these standards is necessary in order to accurately determine the price as well as other conditions of marketing. In the case of produce, various devices have been employed to grade fruits and vegetables, and most have met with great acceptance in that industry. In the marketing of crayfish, however, little has been done to provide an effective grading method, perhaps due to the difficulty in handling these live creatures. Attempts at grading crustaceans have ranged from manual inspection by unskilled laborers to modification of existing produce graders.

One of the methods currently in use involves vibrating a table having spaced-apart horizontal bars wherein the distance between adjacent prongs becomes continuously greater as the crayfish travel horizontally away from the loading area. Another method uses a pair of rotating cylinders spaced apart wherein the distance between the cylinders becomes continuously greater as the crayfish travel away from the loading area. Still another technique for grading crayfish utilizes a single tier of horizontally spaced bars which can be shaken to facilitate the crayfish passing between adjacent bars. The problem with these techniques, however, is that each one fails to yield the consistency and ease of use that are the goals of an effective grading system.

At the present time in Louisiana, there are at least four grades of crayfish based on weight. The first grade (so-called "export" size) are the largest and typically range from 7–14 crayfish per pound. The second grade (so-called "live" size), being slightly smaller, ranges from 15–22 crayfish per pound. The third grade (so-called "processing" size) ranges from 23–30 crayfish per pound, and the fourth grade (so-called "culls") is anything over 30 crayfish per pound. Based on statistical data available to the inventor regarding the growth of crayfish, these grades based on weight are accurately translatable into grades based on size, i.e. physical dimensions, by measurement of the thoracic cavity of the crayfish.

The present invention, therefore, accomplishes a dependable method of grading crayfish using a multiple-tiered grate assembly whose bar spacing is a function of the size of the crayfish thoracic cavity. This invention also helps to alleviate problems seen in the related art by using this grate assembly within a water environment. By simulating their habitat, this novel technique allows the crayfish to seek the lowest possible level on their own within the confines of a static structure, thus resulting in "self-grading" without the need for vibrating trays or rotating parts. Such a design not only speeds up the grading process, but minimizes damage to the crayfish.

SUMMARY OF THE INVENTION

Therefore, it is an object of this invention to provide an apparatus for grading crayfish which allows the natural instincts and locomotion of the crayfish to produce the grading effect.

It is another object of this invention to provide an apparatus for grading crayfish which is quick and simple to use by having no moving parts and requiring no intervention by an operator during the grading period.

It is still another object of this invention to provide an apparatus for grading crayfish which will minimize damage to the crayfish during the grading process.

These and other objects and advantages of the present invention will no doubt become apparent to those skilled in the art after having read the following description of the preferred embodiments and which are contained in and illustrated by the various drawing figures.

Accordingly, an apparatus for grading crayfish is provided, comprising a tank having a bottom and sides forming a cavity which will hold water; and a grate assembly having multiple, vertically separated tiers to form spaces between adjacent tiers of sufficient size to accommodate a pre-determined amount of crayfish of pre-determined size. Each tier comprises multiple, horizontally separated round bars, the spacing between the bars in each succeeding lower tier being less than the spacing in the upper tiers.

A process for grading crayfish of multiple sizes is also provided, comprising the steps of loading crayfish onto a top tier of a grate assembly of the type described above positioned in a water-filled tank, lifting the grate assembly from the tank after a period sufficient in time to allow all crayfish to seek the lowest level tier achievable in accordance with their size, and removing all crayfish located between one set of adjacent tiers separately from crayfish located between any other set of adjacent tiers.

DETAILED DESCRIPTION OF PREFERRED EMBODIMENTS OF THE INVENTION

Figure 1:
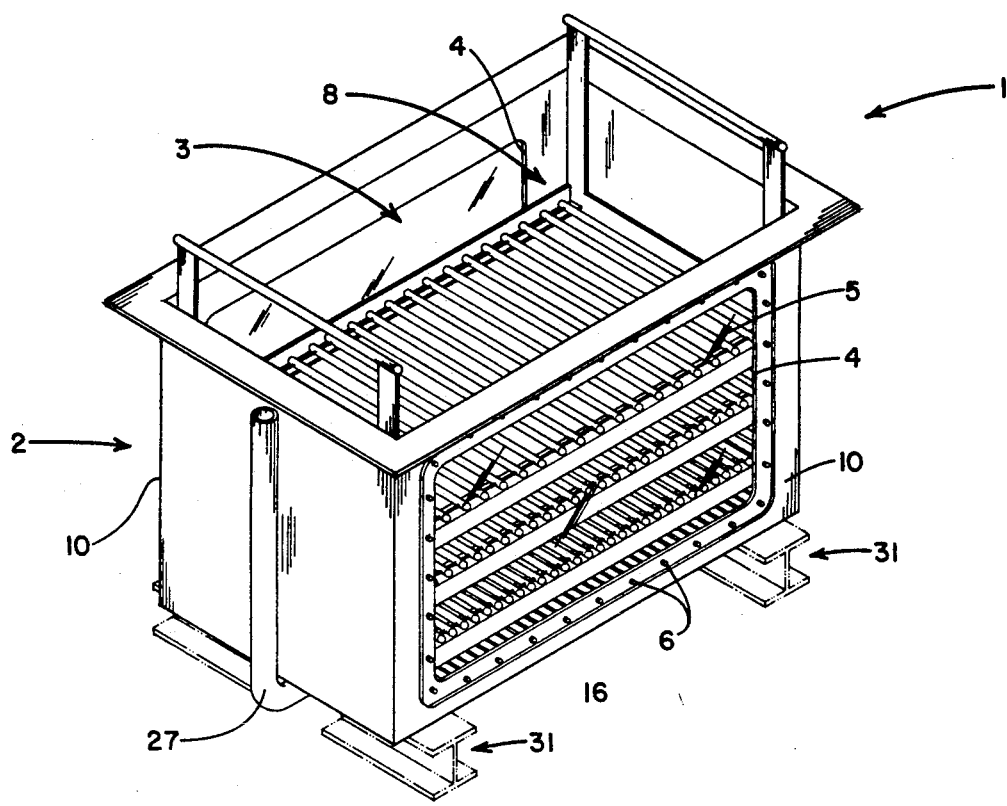
FIG. 1 is a view of a preferred embodiment of the crayfish grading apparatus in an assembled configuration.
Figure 2:
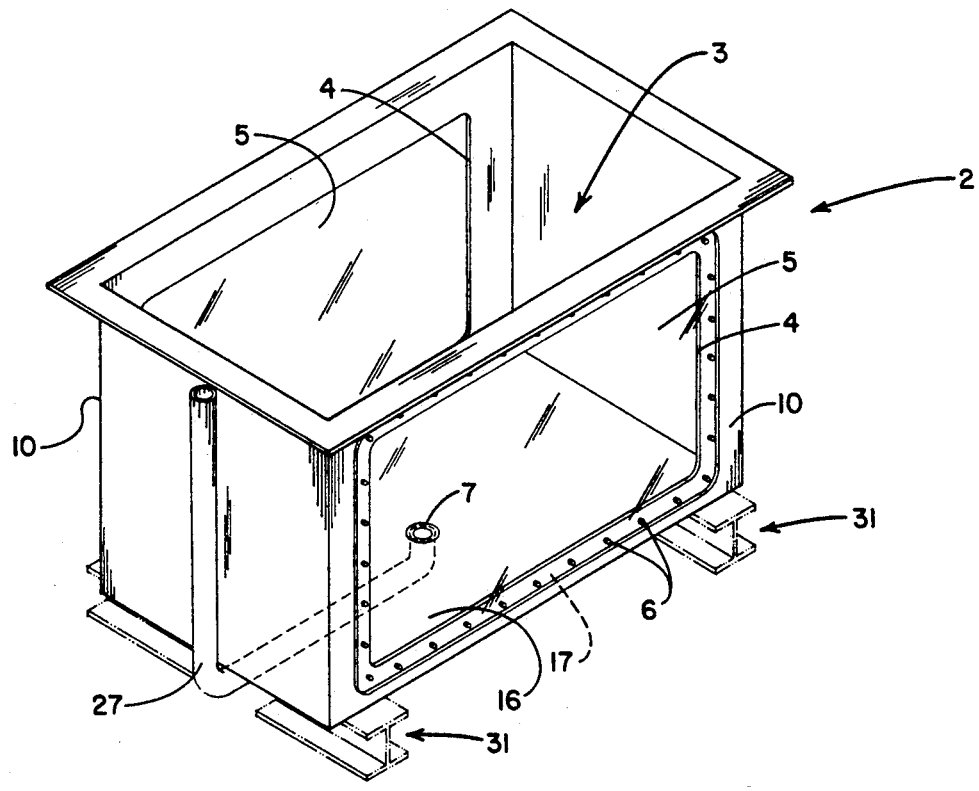
FIG. 2 is a view of the tank, depicting the drain and transparent portions.

Shown in FIG. 1 is a three-dimensional view of a preferred embodiment of the crayfish grading apparatus 1 in an assembled configuration. The major components of the apparatus 1 are tank and grate assembly 8. FIG. 2 reveals that tank 2 includes sides 10 and bottom 16 formed together to create tank cavity 3, which is capable of holding water. Drain 7 is formed in bottom 16 in order to empty water from tank 2 for cleaning. Drain pipe 27 is attached to the underside of drain 7 and extends horizontally under bottom 16 until it forms a 90 degree bend and continues up side 10 at a height level with the top of tank 2. Tank 2 is supported by I-beams 31 or any other suitable structure which allows the unobstructed use of drain pipe 27. Although not required for proper operation of the present invention, each of two sides 10 has a window 4 covered by a transparent sheet 5 which is made of a durable material such as clear plastic or some other material sold under the tradename Plexiglass. The sheet 5 is attached to side 10 by screws 6 or any other equivalent fastener, and when assembled should form a water-tight seal 17. Seal 17 can be simply a continuous line of silicone or possibly a rubberized strip between side 10 and sheet 5.

Figure 3:
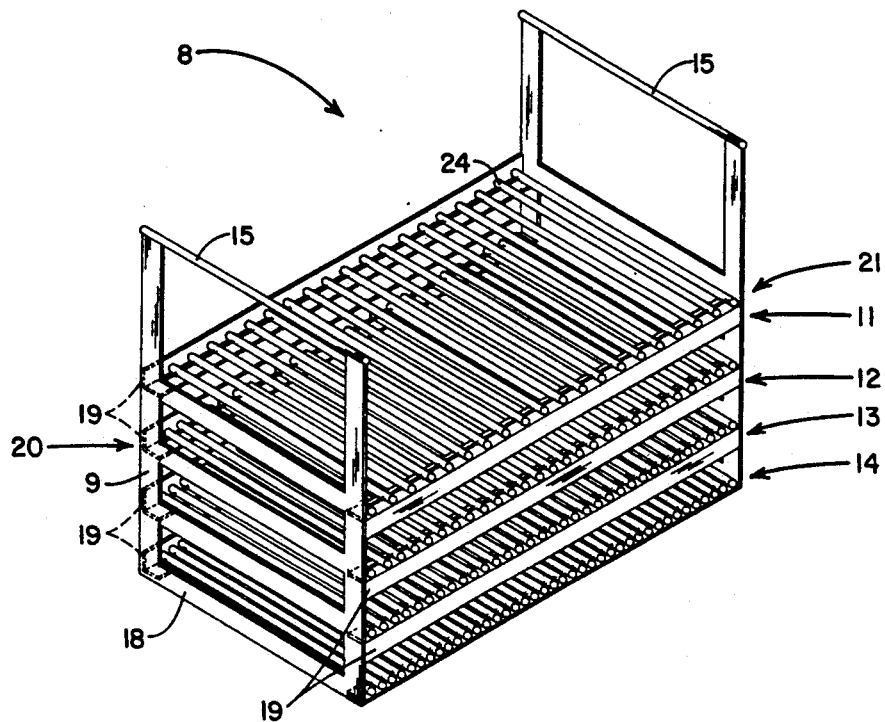
FIG. 3 is a view of the grate assembly, depicting the multiple tiers and horizontally spaced bars in each tier.

Grate assembly 8 is depicted in FIG. 3 and includes frame 9, first, second, third and fourth tube assemblies 11, 12, 13, 14 and handles 15. Frame 9 is constructed of two vertical, parallel walls 18 which are rigidly joined on each opposing end by first set 20 and second set 21, respectively, of vertically-spaced horizontal support members 19. The number of support members 19 in each set 20, 21 is equal to the number of tube assemblies 11, 12, 13, 14. In a preferred embodiment, first set 20 is composed of channel stock where one length-wise edge is directed vertically upward and the other edge directed toward the interior of frame 9. Second set 21 is also composed of channel stock, but positioned so that one edge is directed toward the interior of frame 9 and the other edge directed vertically downward. Furthermore, the outside horizontal edge of each support member 19 of second set 21 is level with the inside horizontal edge of its corresponding support member 19 of first set 20. This construction is used to support first, second, third and fourth tube assemblies 11, 12, 13, 14 in such a way as to allow sliding of tube assemblies 11, 12, 13, 14 in and out of frame 9, as well as to facilitate the removal of crayfish 29 from each level.

Figure 4:
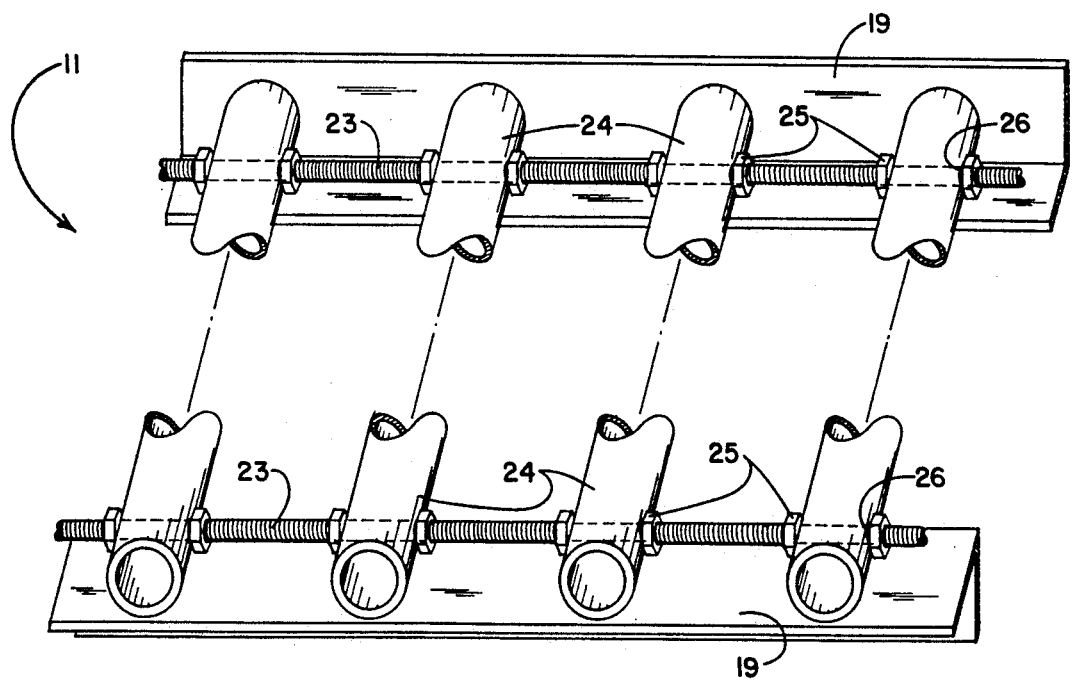
FIG. 4 is a close-up view of the bars as they are attached to a preferred embodiment of the grate assembly.
Figure 5:
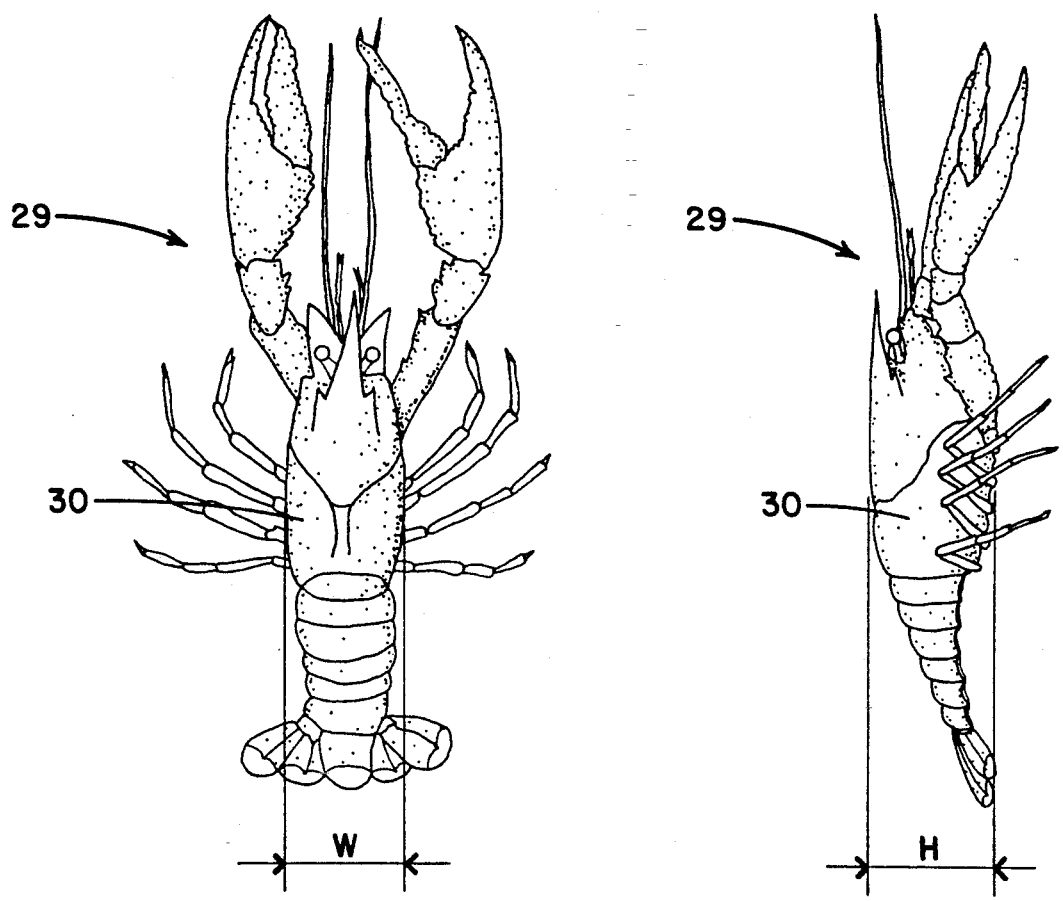
FIG. 5 is a view of a crayfish showing the thoracic cavity.

First tube assembly 11 is used to collect those crayfish 29 qualifying as "export" grade (Grade 1) as explained above. As shown in FIG. 4, the construction of first tube assembly 11 includes aluminum tubing sections 24 having holes 26 formed through the diameter of each tubing section 24 near each end. Threaded rod 23 is placed through holes 26 and lock nuts 25 are placed on each side of each tubing section 24 in order to fix the position of each tubing section 24 with respect to the other tubing sections 24. The exact number of tubing sections 24 in first tube assembly 11 is unimportant, but it is essential that there be enough to fill the area where first tube assembly 11 is to rest while in operation. Because of the need to prevent the crayfish 29 from sitting on top of tubing sections 24, the inventor has determined that the preferred outer diameter size for tubing sections 24 is to be no greater than ⅞". Likewise, tubing sections 24 should have an outer diameter of at least ⅝" to prevent the crayfish 29 from attaching to them by using their pinchers. Based on the dimensions of the thoracic cavity 30 of crayfish 29, the maximum spacing between the outer diameters of any two tubing sections 24 to retain Grade 1 crayfish 29 should be 15/16" (0.938"). To allow passage of Grade 2 crayfish 29 through first tube assembly 11, the minimum spacing should be at least 0.913". Second and third tube assemblies 12, 13 are constructed in exactly the same way, except that the maximum spacing between tubing sections 24 in second tube assembly 12 is 0.912" and the minimum spacing is 0.812". The maximum and minimum spacings for third tube assembly 13 are 0.811" and 0.688", respectively. Fourth tube assembly 14 is similarly constructed, except that tubing sections 24 have only ½" outer diameters and are welded to rod 23 in such a way as to allow a spacing of ⅜" or less, but with still enough spacing to allow water to pass through with ease.

In operation, tank 2 is filled with water, while tube assemblies 11, 12, 13, 14 are placed into grate assembly 8 with first tube assembly 11 being in the uppermost position and with second, third and fourth tube assemblies 12, 13, 14 being placed in order below first tube assembly 11. Grate assembly 8 is lowered into tank cavity 3 until it rests on tank bottom 16. Crayfish 29 of various sizes are then dumped into tank cavity 3 and allowed time to seek their lowest possible level. Once the crayfish 29 are settled, grate assembly 8 is slowly lifted from tank cavity 3 to expose first tube assembly 11 and the Grade 1 crayfish 29 are removed by pushing them off the unobstructed end of first tube assembly 11. The Grades 2–4 crayfish 29 are similarly procured by further lifting grate assembly 8 and removing them in the same manner described above. Once all crayfish 29 have been removed, grate assembly 8 is lowered back into tank cavity 3 and the apparatus 1 is ready for another load of crayfish 29 to be graded. If cleaning is necessary, drain pipe 27 is removed from drain 7 in tank 2 so that the water is drained from tank 2.

Other embodiments of the apparatus and method of the invention will occur to those skilled in the art, and are intended to be included within the scope and spirit of the following claims.

I claim:

1. A process for grading crayfish of multiple sizes, comprising the steps of:
    (a) loading said crayfish onto a top tier of a grate assembly positioned in a water-filled tank, said grate assembly comprising multiple, vertically separated tiers forming spaces between adjacent tiers of sufficient size to accommodate a pre-determined amount of crayfish of pre-determined size, wherein each tier comprises multiple, horizontally separated bars, the spacing between said bars in each succeeding lower tier being less than the spacing in the upper tiers;
    (b) lifting said grate assembly from said tank after a period sufficient in time to allow all crayfish to seek the lowest level tier achievable in accordance with the size of said crayfish; and
    (c) removing all crayfish located between one set of adjacent tiers separately from crayfish located between any other set of adjacent tiers.

2. An apparatus for grading crayfish, comprising:
    (a) a tank having a bottom and sides forming a cavity which will hold water;
    (b) a grate assembly having multiple, vertically separated tiers to form spaces between adjacent said tiers of sufficient size to accommodate a pre-determined amount of crayfish of pre-determined size, wherein each tier comprises multiple, horizontally separated bars, the spacing between said bars in each succeeding lower tier being less than the spacing in the upper tiers; and
    (c) wherein said grate assembly comprises:
        (i) a frame;
        (ii) a first tier attached to said frame wherein the spacing between said bars is no greater than 0.938 inches and no smaller than 0.913 inches;
        (iii) a second tier attached to said frame directly beneath said first tier wherein the spacing between said bars is no greater than 0.912 inches and no smaller than 0.812 inches;
        (iv) a third tier attached to said frame directly beneath said second tier wherein the spacing between said bars is no greater than 0.811 inches and no smaller than 0.688 inches; and
        (v) a fourth tier attached to said frame directly beneath said third tier wherein the spacing between said bars is no greater than 0.375 inches and yet large enough to allow the passage of water during placement into and removal from said tank of said grate assembly.

* * * * *